(12) United States Patent
Karanth et al.

(10) Patent No.: US 8,868,943 B2
(45) Date of Patent: Oct. 21, 2014

(54) STATELESS REMOTE POWER MANAGEMENT OF COMPUTERS

(75) Inventors: Sandeep Karanth, Bangalore (IN); Ohil Manyam, Bengaluru (IN)

(73) Assignee: Microsoft Corporation, Redmond, WA (US)

( * ) Notice: Subject to any disclaimer, the term of this patent is extended or adjusted under 35 U.S.C. 154(b) by 545 days.

(21) Appl. No.: 12/955,380

(22) Filed: Nov. 29, 2010

(65) Prior Publication Data

US 2012/0137146 A1 May 31, 2012

(51) Int. Cl.
*G06F 1/32* (2006.01)
*H04L 12/12* (2006.01)

(52) U.S. Cl.
CPC ............. *G06F 1/3209* (2013.01); *Y02B 60/34* (2013.01); *H04L 12/12* (2013.01)
USPC ......................................... 713/310

(58) Field of Classification Search
CPC ........................................ G06F 1/32
USPC ........................................ 713/310
See application file for complete search history.

(56) References Cited

U.S. PATENT DOCUMENTS

| 6,101,608 | A | 8/2000 | Schmidt et al. |
| 6,381,700 | B1 * | 4/2002 | Yoshida .............................. 726/4 |
| 6,493,824 | B1 | 12/2002 | Novoa et al. |
| 6,567,931 | B1 | 5/2003 | Jue |
| 6,799,278 | B2 * | 9/2004 | Khatri et al. .................. 713/300 |
| 7,103,628 | B2 * | 9/2006 | Neiman et al. ................ 709/201 |
| 8,234,701 | B2 * | 7/2012 | Cheung et al. ................. 726/12 |
| 2005/0160165 | A1 | 7/2005 | Chen et al. |
| 2008/0120512 | A1 | 5/2008 | Wang |
| 2008/0281959 | A1 * | 11/2008 | Robertson ..................... 709/224 |
| 2009/0083560 | A1 * | 3/2009 | O'Connell et al. ........... 713/323 |

OTHER PUBLICATIONS

"Computer Remote Wake-Up via SMS", Retrieved at <<http://priorartdatabase.com/IPCOM/000154342#textpreview>>, Jun. 27, 2007, pp. 2.
"Smartphone Application from 1E enables Remote Power on LAN", Retrieved at << http://www.allbusiness.com/electronics/computer-equipment-personal-computers/13984995-1.html>>, Feb. 22, 2010, pp. 2.
Pombeiro, Pedro., "Waking up the Computer at the Office with your Cell Phone", Retrieved at << http://sweux.com/blogs/pombeiro/index.php/2010/01/29/waking-up-the-computer-at-the-office-with-your-cell-phone/>>, Jan. 29, 2010, pp. 5.

* cited by examiner

*Primary Examiner* — Kim Huynh
*Assistant Examiner* — Eric Chang
(74) *Attorney, Agent, or Firm* — Steve Wight; Carole Boelitz; Micky Minhas

(57) ABSTRACT

A remote power management system and method for awakening a remote computing device over a computer network. A wakeup event is initiated by a client on the network, and an application server publishes the wakeup event. A subscriber, such as the subnet where the remote computing device resides, picks up the wakeup event and gives it to a computing device on the subnet that is awake. The awake computing device constructs a "magic packet" to take advantage of the automatic wakeup feature of the network card on the remote computing device, and broadcasts the "magic packet" throughout the subnet. Stateless handling of wakeup events is used to alleviate any need for a dedicated proxy server on the subnet to send the "magic packets." The computing device on the subnet that constructs and broadcasts the "magic packets" is rotated to provide equitable rest time for each of the computing devices.

20 Claims, 11 Drawing Sheets

STATELESS REMOTE POWER MANAGEMENT OF COMPUTERS

BACKGROUND

Energy consumption due to desktop personal computers (PCs) in the United States alone was around 16 TWh per year in the early part of the millennium and is steadily growing. Energy production is both expensive in terms of monetary costs and the cost of the number of adverse effects on the environment. This makes conservation of energy a popular topic of discussion.

On average, an idle PC consumes around 50 Watts of power when running and just 2 Watts of power when switched off or in a lower power consumption state, known as a "sleep" state. Even though a computer provides these low power states, users in enterprises tend to keep their computers switched on when they are not in use. A significant percentage of computers have their aggressive power management policies disabled by the user. This is in part because users want to work remotely either from home or on their commute and want round-the-clock access to their data on these machines.

Modern commodity network cards have the "Wake-On-LAN" feature enabled. This feature enables waking up of machines by means of a network packet with a machine identifier termed as a "magic packet". However, this feature works only when a "magic packet" is sent from within the same subnet as the machine that is to be awakened. With this feature, any kind of wakeup within an enterprise network would then require a dedicated machine on every subnet that broadcasts these packets.

One problem, however, with this technique is that it often does not scale and the dedicated proxy becomes a central point of failure. If inter-subnet broadcast of "magic packets" are a requirement then the router configuration needs to be changed to allow these packets to traverse subnets. This is not recommended by enterprise information technology (IT) security personnel as they pose significant security risks.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

Embodiments of the stateless remote power management system and method remotely awakens a sleeping computing device over a computer network (such as the Internet). Embodiments of the stateless remote power management system and method use stateless handling of wakeups that alleviate any need for a dedicated proxy server on the subnet to send the "magic packets." Because of this stateless design, any of the computing devices on the subnet that are awake can construct the "magic packet." This "magic packet" then is broadcast on the subnet to awaken the target computing device. The computing devices that are awake at any given time and can construct and broadcast the "magic packet" are rotated to provide equitable rest time for each of the computing devices on the subnet.

Embodiments of the stateless remote power management system and method include a client module that a user can use to invoke a network application to connect to the target computing device. Moreover, the user is able to manually wakeup the target computer using a variety of interfaces. Thus, the target computer can be awakened by the user from a web page, or using an email, short messaging service (SMS), radio frequency identification (RFID) tags, and magnetic cards.

Embodiments of the stateless remote power management system and method include an application server in communication with the client module over a computer network. The application server receives the request from the client module to initiate the wakeup of the target computing device, and adds wakeup enhancement data to the wakeup event to facilitate easier establishment of a connection between the client module and the target computing device. The wakeup event is republished and then placed in a persistent event queue. The wakeup event stays there until a subscriber (such as a subnet on which the target computing device resides) picks up the wakeup event.

Embodiments of the stateless remote power management system and method also include a client network system containing subnets, where each of the subnets has a plurality of computing devices. The subnet on which the target computing device resides picks up the wakeup event and extracts the wakeup enhancement data. The subnet contains both computing devices that are awake and computing devices that are asleep. One of the awake computing devices on the subnet then constructs a "magic packet" that is a network packet having a computing device identifier of the target computing device. The "magic packet" then is broadcast throughout the subnet to wake up the sleeping peer on the subnet.

Embodiments of the stateless remote power management system and method also include a heartbeat recorder and analysis module that ensures that there are enough computing devices awake on the subnet at any given time. In particular, embodiments of the stateless remote power management system and method keep track of the number of computing devices awake on the subnet by having each awake computing device periodically send a heartbeat to the heartbeat recorder and analysis module. From this the module can determine the number of computing devices awake on the subnet. This number is compared to an awake threshold, which indicates the number of computing devices on the subnet that need to be awake. If this number is less than the awake threshold, then the module determines the computing devices on the subnet that have been asleep the longest. Sleeping computing devices are awakened to bring the number of computing devices awake on the subnet equal to the awake threshold.

It should be noted that alternative embodiments are possible, and that steps and elements discussed herein may be changed, added, or eliminated, depending on the particular embodiment. These alternative embodiments include alternative steps and alternative elements that may be used, and structural changes that may be made, without departing from the scope of the invention.

DRAWINGS DESCRIPTION

Referring now to the drawings in which like reference numbers represent corresponding parts throughout:

DETAILED DESCRIPTION

In the following description of embodiments of a stateless remote power management system and method, reference is made to the accompanying drawings, which form a part thereof, and in which is shown by way of illustration a specific example whereby embodiments of the stateless remote power management system and method may be practiced. It is to be understood that other embodiments may be utilized and structural changes may be made without departing from the scope of the claimed subject matter.

I. System Overview

Figure 1:
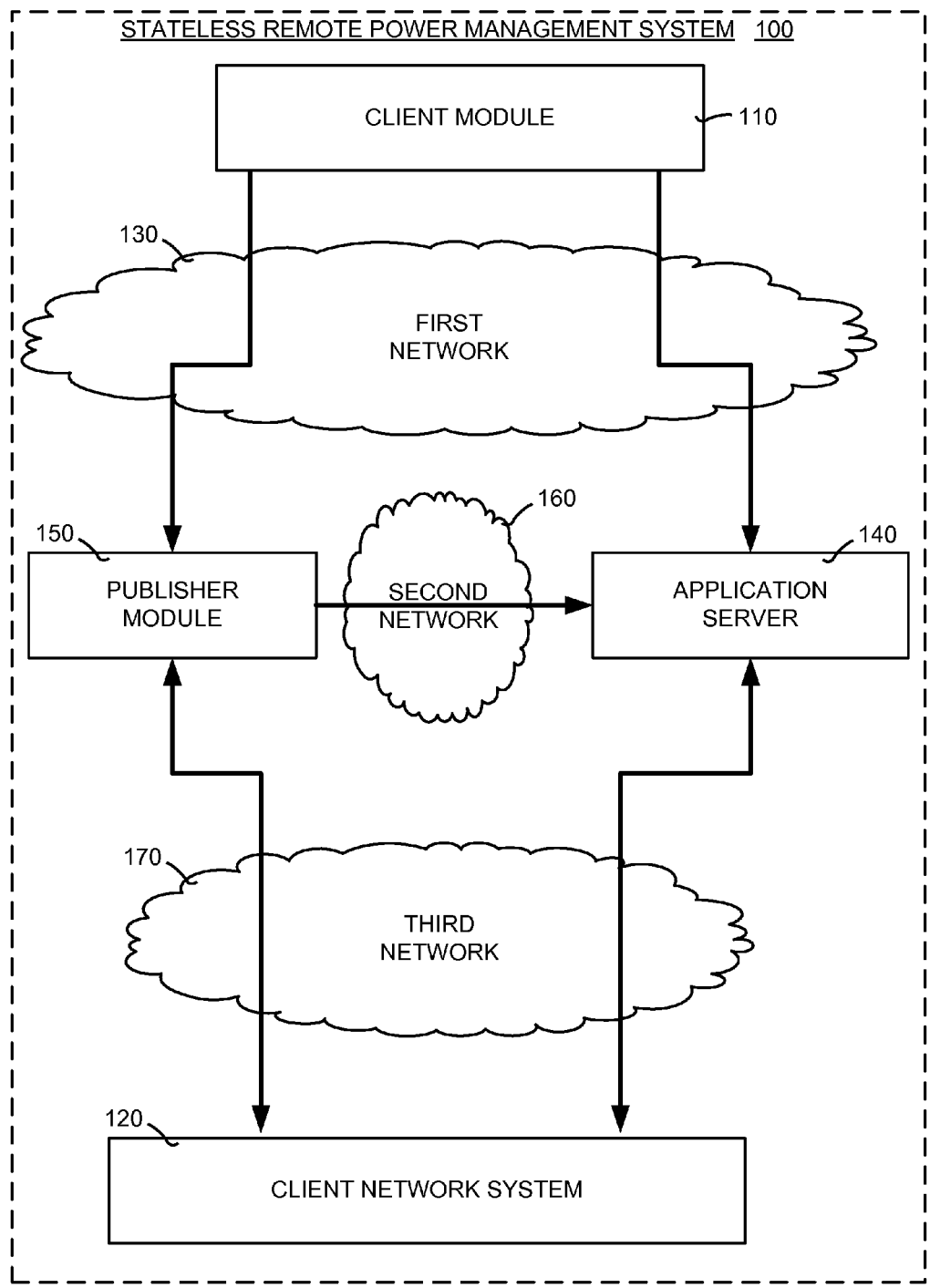
FIG. 1 is a block diagram illustrating a general overview of embodiments of a stateless remote power management system and method implemented on computing devices and in a computing environment.

FIG. 1 is a block diagram illustrating a general overview of embodiments of a stateless remote power management system 100 and method implemented on computing devices and in a computing environment. Note that FIG. 1 is merely one way in which embodiments of the stateless remote power management system 100 and method may be implemented, and is shown merely for illustrative purposes. It should be noted that there are several other ways in which embodiments of the stateless remote power management system 100 and method may be implemented, which will be apparent to those having ordinary skill in the art.

In general, embodiments of the stateless remote power management system 100 and method facilitate the automatic wakeup of a remote computer over a network (such as the Internet) based on invoking a network application to connect to the remote computer without specialized hardware. Moreover, embodiments of the stateless remote power management system 100 and method allow stateless handling of waking up a remote computer without using dedicated machines to send "magic packets." Embodiments of the stateless remote power management system 100 and method also provide manual wakeup of the remote computer over a network using a variety of different interfaces such as a web page, SMS, RFID tags, and magnetic cards.

Embodiments of the stateless remote power management system 100 and method eliminate any need for a dedicated wakeup proxy for each subnet. This is achieved by having stateless handling of wakeups at the network layer of the subnet. A "stateless" server is a server that treats each request as an independent transaction that is unrelated to other requests earlier in time. Moreover, not only is each request treated independently, but also no computing device in the client network has information about any other computing device. This means that the computing devices in the network have equal rank and are peers of one another. A stateless design simplifies the server design and eliminates the need to store previous requests and requests in progress. Thus, any need for a dedicated wakeup proxy for each subnet to send the "magic packets" is eliminated.

As shown in FIG. 1, a client module 110 contains the interfaces and network application with which a user communicates with a remote computer on a client network system 120. Depending on the interface used, the client module 110 sends requests over a first network 130 to an application server 140 or a publisher module 150. The publisher module 150 contains a variety of publishers that publish requests from the user to any subscribers. Any requests from the user via the client module 110 that go through the publisher module 150 are processed by the publisher module 150 and then sent over a second network 160 to the application server 140.

The application server 140 contains a variety of modules that perform the actual publishing of events initiated by the user through the client module 110 and that monitor the status of machines on the client network system 120. The application server 140 communicates with the client network system 120 over a third computer network 170. Similarly, the publisher module 150 also communicates with the client network system 120 over the third network 170. The client network system 120 contains at least one subnet and a plurality of computing devices or machines in each subnet. It should be noted that although three networks 130, 160, 170, are illustrated in FIG. 1, in some embodiments these three computer networks could be a single computer network (such as the Internet).

II. System Details

Embodiments of the stateless remote power management system 100 and method include several components. The components include the client module 110, the application server 140, and the client network system 120. The system details of each of these components will now be discussed.

II.A. Client Module

Figure 2:
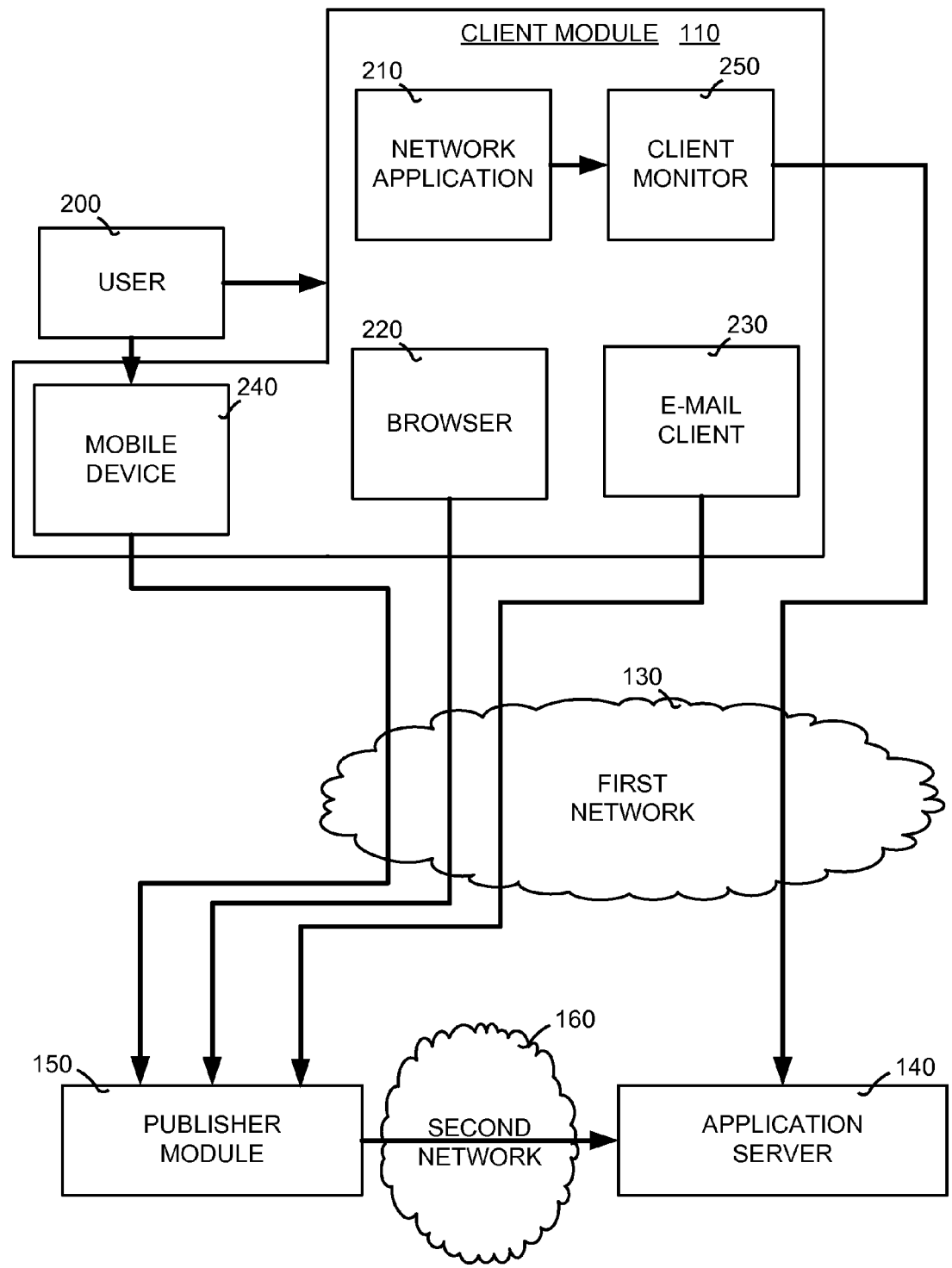
FIG. 2 is a block diagram illustrating details of the client module of embodiments of the stateless remote power management system and method shown in FIG. 1.

FIG. 2 is a block diagram illustrating details of the client module 110 of embodiments of the stateless remote power management system 100 and method shown in FIG. 1. A user 200 interacts with the client module 110 through the standard user interface processes. The client module 110 gives the user a variety of ways to initiate an event directed to a target computer on a remote network.

More specifically, as shown in FIG. 2, the client module 110 includes a variety of interfaces including a network application 210, a browser 220, an e-mail client 230, and a mobile device 240. The network application 210 gives the user 200 a way to initiate an event using an application. When the user 200 initiates an event through the network application 210, a client monitor 250 is also used to filter that event and direct the event to the application server 140 for publishing to a subscriber.

The user 200 can also initiate an event through a variety of other ways. This includes using a web page on the browser 220, sending an e-mail through the e-mail client 230, and sending an SMS message or the web page or e-mail on the mobile device 240. An event initiated through the browser 220, the e-mail client 230, or the mobile device 240 is sent over the first network 130 to the publisher module 150. The publisher module 150 then processes the event request and sends it on over the second network 160 to the application server 140 for publishing.

II.B. Application Server

Figure 3:
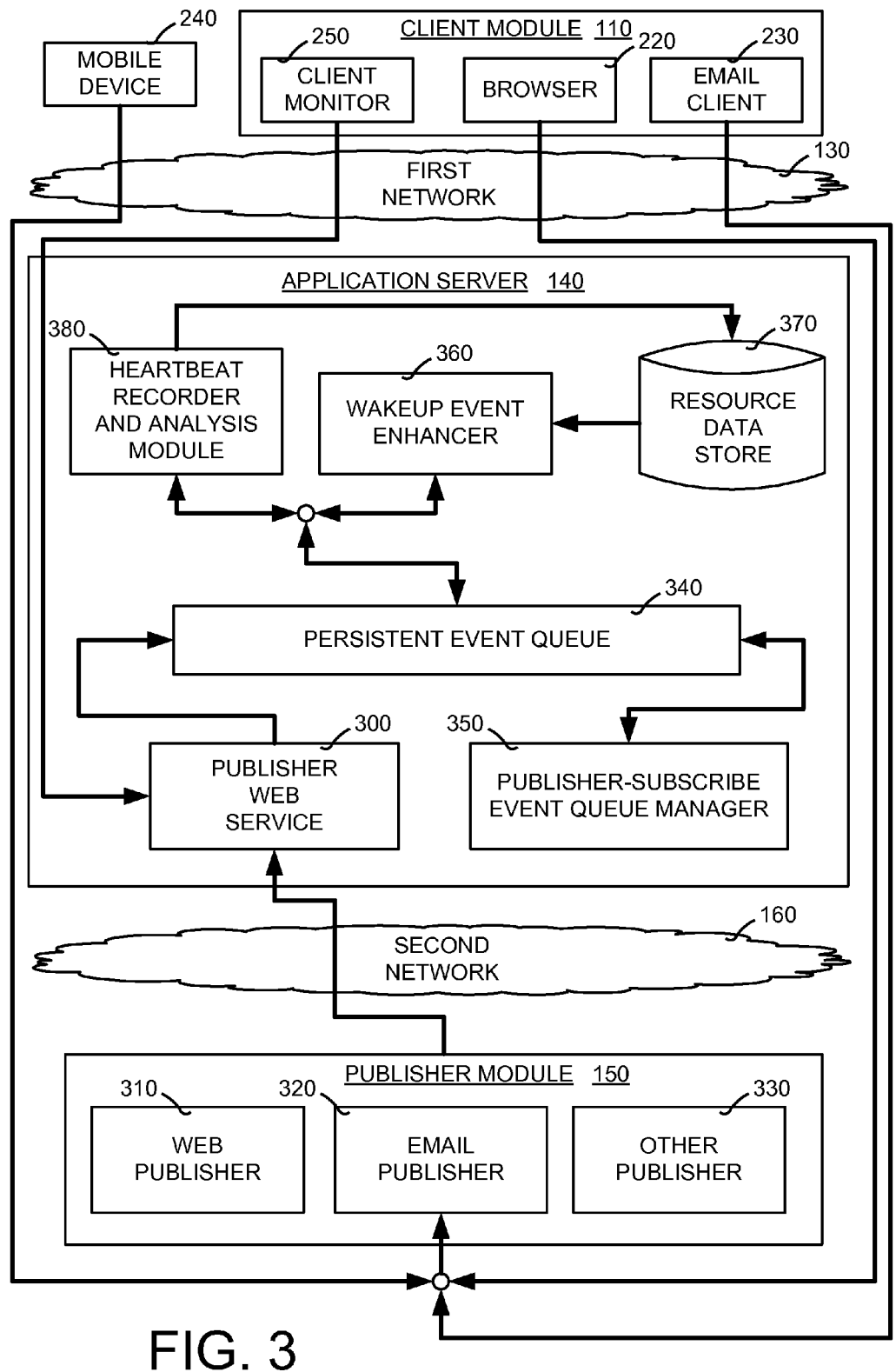
FIG. 3 is a block diagram illustrating details of the application server of embodiments of the stateless remote power management system and method shown in FIG. 1.

FIG. 3 is a block diagram illustrating details of the application server 140 of embodiments of the stateless remote power management system 100 and method shown in FIG. 1. As shown in FIG. 3, the application server 140 includes a publisher web service that publishes an event initiated by the user 200 to subscribers. The publisher web service 300 can receive a request to publish an event from the client monitor 250. In addition, the publisher web service 300 can receive a request to publish an event from the mobile device 240, browser 220, or e-mail client 230.

The publisher module 150 includes a web publisher 310, e-mail publisher 320, and other publishers 330. Any request initiated by the user 200 from the mobile device 240, browser 220, or e-mail client 230 goes through the appropriate one of the web publisher 310, e-mail publisher 320, or other publishers 330 for processing. The event request then is sent through the second network 160 to the publisher web service 300.

Once the event is initiated and is ready for publishing, it is sent to a persistent event queue 340. Here the event remains until it has been obtained by a subscriber. Moreover, the persistent event queue is managed by a publisher-subscribe event queue manager 350. As shown in FIG. 3, the persistent event queue 340 and the publisher-subscribe event queue manager 350 are in communication with each other.

The application server 140 also includes a wakeup event enhancer 360. The wakeup event enhancer subscribes to each event in the persistent event queue 340 and adds enhancements to the event pending in the persistent event queue 340. These enhancements include the media access control (MAC) address of the target machine on a remote network. These enhancements are added prior to the event being published and picked up by a subscriber (except for the wakeup event enhancer 360).

The data used to enhance the event is written to and stored in a resource data store 370. The resource data store 370 can receive enhancement data locally or from a third-party information repository. The application server 140 also includes a heartbeat recorder and analysis module 380 that monitors the number of machines awake on each subnet in the client network system 120. If the number of machines awake falls below a certain number, then the heartbeat recorder and analysis module 380 executes a judicious procedure to wake up one or more machines. This ensures that the number of machines awake at any time on a subnet meets the minimum required to wakeup other sleeping machines on the subnet.

II.C. Client Network System

Figure 4:
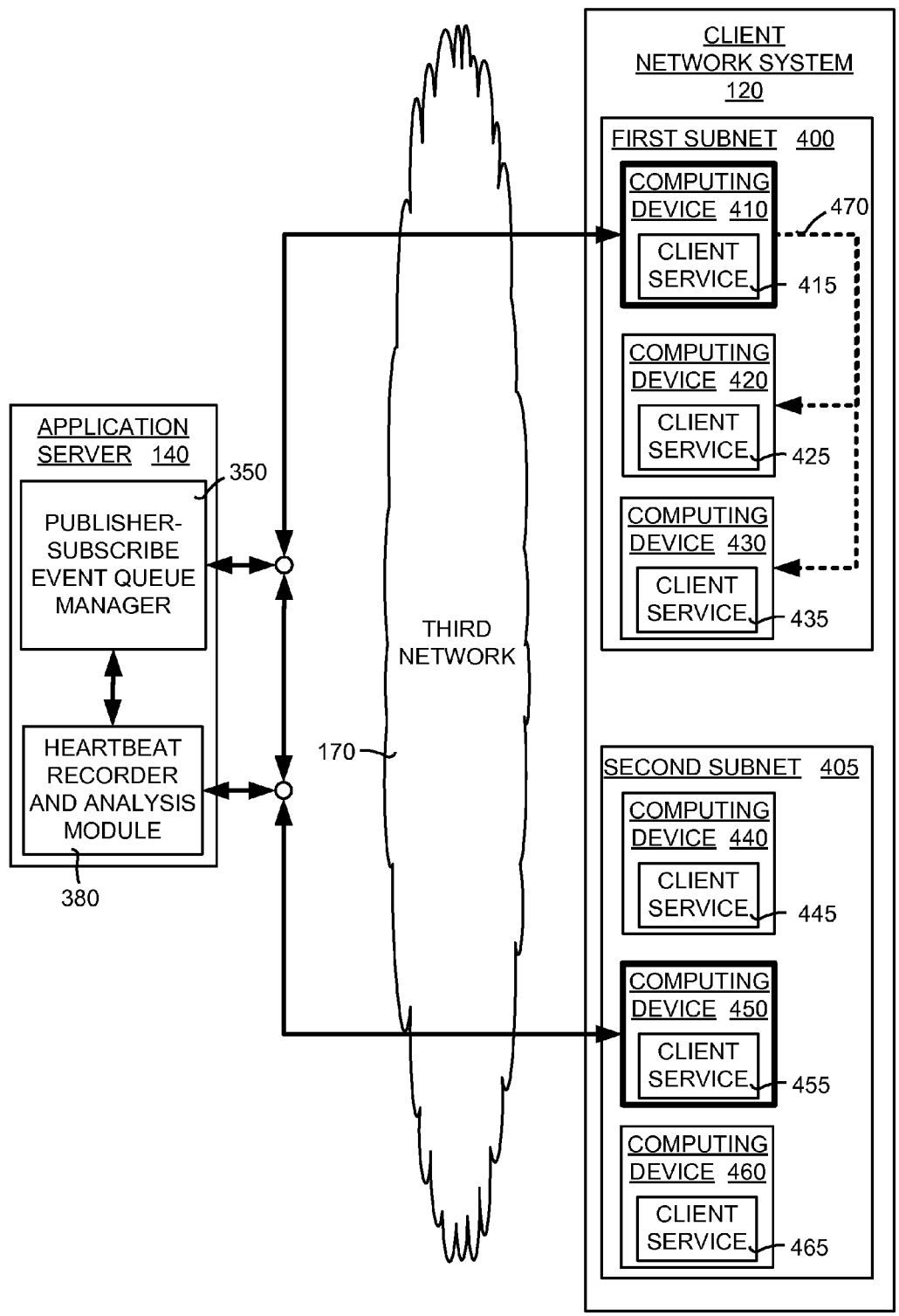
FIG. 4 is a block diagram illustrating details of the client network system of embodiments of the stateless remote power management system and method shown in FIG. 1.

FIG. 4 is a block diagram illustrating details of the client network system 120 of embodiments of the stateless remote power management system 100 and method shown in FIG. 1. The client network system 120 shown in FIG. 4 includes a first subnet 400 and a second subnet 405. It should be noted that although two subnets 400, 405 are shown in FIG. 4, embodiments of the client network system 120 may include more or fewer subnets than shown in FIG. 4.

The first subnet 400 includes a first computing device 410 having a first client service 415, a second computing device 420 having a second client service 425, and a third computing device 430 having a third client service 435. The second subnet 405 includes a fourth computing device 440 having a fourth client service 445, a fifth computing device 450 having a fifth client service 455, and a sixth computing device 460 having a sixth client service 465. It should be noted that although FIG. 4 illustrates that the first subnet 400 and the second subnet 405 each contain three computing devices, each subnet may contain more or fewer computing devices. In addition, although FIG. 4 illustrates that the first subnet 400 and the second subnet 405 have the same number of computing devices, it will be appreciated that this is not necessary and that the first subnet 400 can contain more, fewer, or the same number of computing devices as the second subnet 405.

The first subnet 400 and the second subnet 405 are in communication with the publisher-subscribe event queue manager 350 on the application server 140. Specifically, the publisher-subscribe event queue manager 350 publishes events to which the first subnet 400 and the second subnet 405 subscribe. This is done by sending the wakeup event to the computing devices in the subnet that are awake.

As shown in FIG. 4, for the first subnet 400 the first computing device 410 is awake. This is denoted by the heavy black outline around the box containing the first computing device 410. The second computing device 420 and the third computing device 430 are asleep. Thus, the publisher-subscribe event queue manager 350 sends the wakeup event to the first computing device 410. Similarly, for the second subnet 405 the fifth computing device 450 is awake, as also denoted by the heavy black outline around the box containing the fifth computing device 450. Moreover, the fourth computing device 440 and the sixth computing device 460 are asleep. Thus, the publisher-subscribe event queue manager 350 sends any wakeup event to the fifth computing device 450.

FIG. 4 illustrates that the publisher-subscribe event queue manager 350 has sent a wakeup event to the first subnet 400. This published wakeup event is subscribed to by the first subnet, and the first computing device 410 (which is awake) receives this wakeup event. As explained in detail below, the first computing device 410 constructs a "magic packet" 470 (whose path is shown by the dotted line in FIG. 4) and broadcasts this "magic packet" 470 to the other computing devices 420, 430, on the first subnet 400. This "magic packet" 470 awakens the target computer, which in this case may be either the second computing device 420, the third computing device 430, or both.

The heartbeat recorder and analysis module 380 monitors both the first subnet 400 and the second subnet 405. This module 380 ensures that a minimum number of computing devices are awake on each subnet at any given time. The awake machines, which in FIG. 4 are the first computing device 410 and the fifth computing device 450, periodically send a heartbeat event to the heartbeat recorder and analysis module 380 to tell the module 380 that they are awake. Moreover, the heartbeat recorder and analysis module 380 intelligently awakens and puts to sleep computing devices based on the number of hours they have been awake. This awakening and putting to sleep of computing devices is achieved without any disruption of any actively-used computing device

III. Operational Overview

Figure 5:
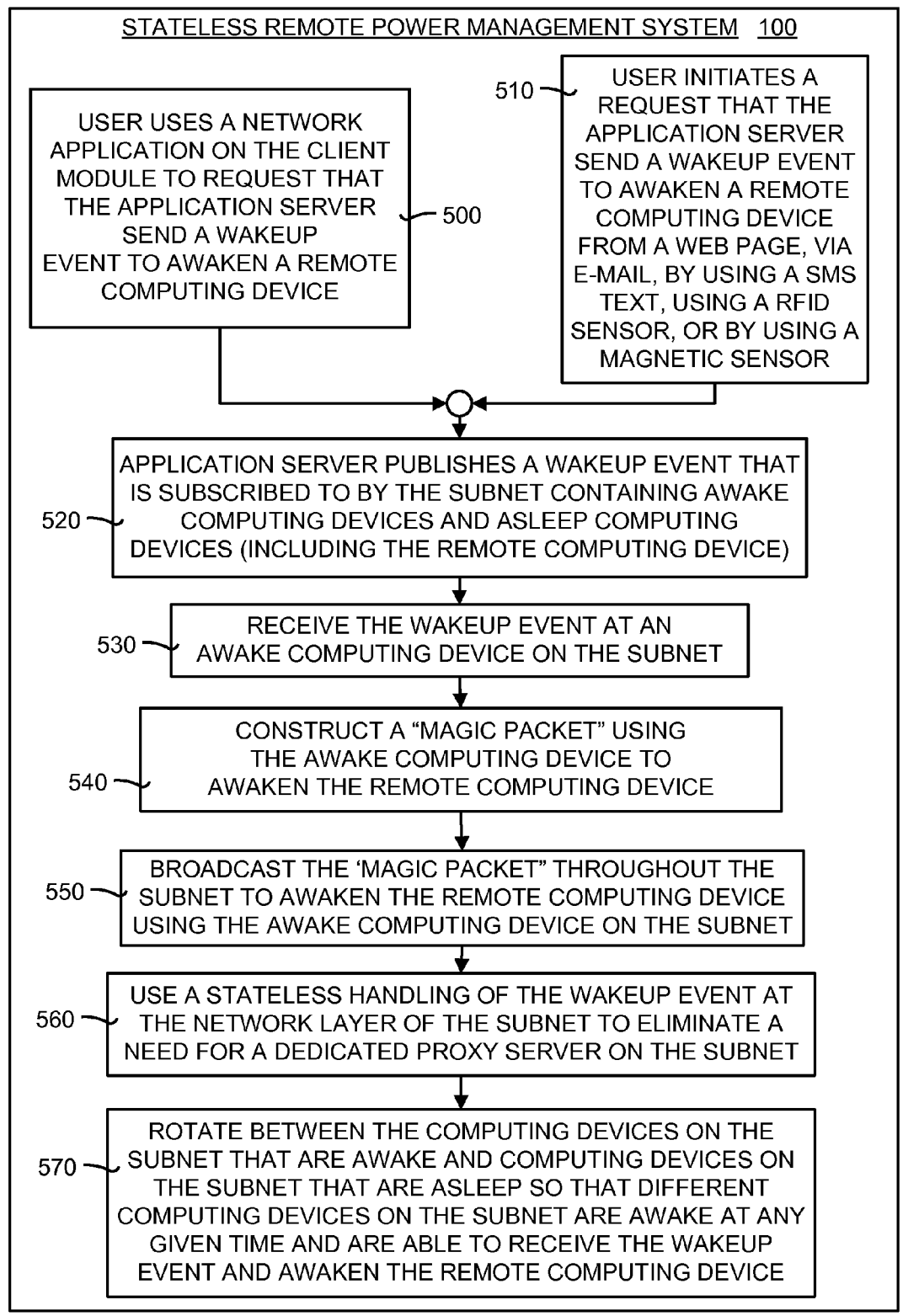
FIG. 5 is a flow diagram illustrating the general operation of embodiments of the stateless remote power management system and method shown in FIG. 1.

FIG. 5 is a flow diagram illustrating the general operation of embodiments of the stateless remote power management system 100 and method shown in FIG. 1. In general, embodiments of the stateless remote power management method awaken a remote computing device over a computer network (such as the Internet). Referring to FIG. 3, the method begins in one of two ways. A first way is by the user 200 using the network application on the client module 110 to request that the application server 140 send a wakeup event to awaken the remote computing device (box 500). A second way is by the user 200 initiating a request that the application server 140 send a wakeup event to awaken a remote computing device from a web page, via e-mail, by using a radio frequency identification (RFID) sensor, or by using a magnetic sensor (box 510).

The application server 140 then publishes a wakeup event that is subscribed to by the first subnet 400 (box 520). The first subnet 400 includes an awake computing device (the first computing device 410) and sleeping computing devices (including the remote computing device). The wakeup event then is received at the first computing device 410 (or awake computing device) on the first subnet 400 (box 530). The awake computing device then constructs a "magic packet" to awaken the remote computing device that is asleep (box 540).

Embodiments of the stateless remote power management method then use the awake computing device to broadcast the "magic packet" throughout the first subnet 400 to awaken the remote computing device (box 550). Embodiments of the stateless remote power management method use a stateless handling of the wakeup event at the network layer off the first subnet 400 (box 560). This eliminates any need for a dedicated proxy server on the first subnet 400. Moreover, the computing devices on the first subnet 400 that are awake and those that are asleep at any given time are rotated (box 570). This means that different computing devices on the subnet are awake at any given time and able to receive the wakeup event and awaken the remote computing device by constructing and broadcasting the "magic packet." As stated above, this alleviates the need for a dedicated proxy server on the subnet.

IV. Operational Details

The system and the operational details of embodiments of the stateless remote power management system 100 and method now will be discussed. These embodiments include embodiments of the client monitor 250, the application server 140, the publisher module 150, the client service module 415, 425, 435, 445, 455, 465, and the heartbeat recorder and analysis module 380. The system and operational details of each of these modules now will be discussed in detail.

IV.A. Client Monitor

Figure 6:
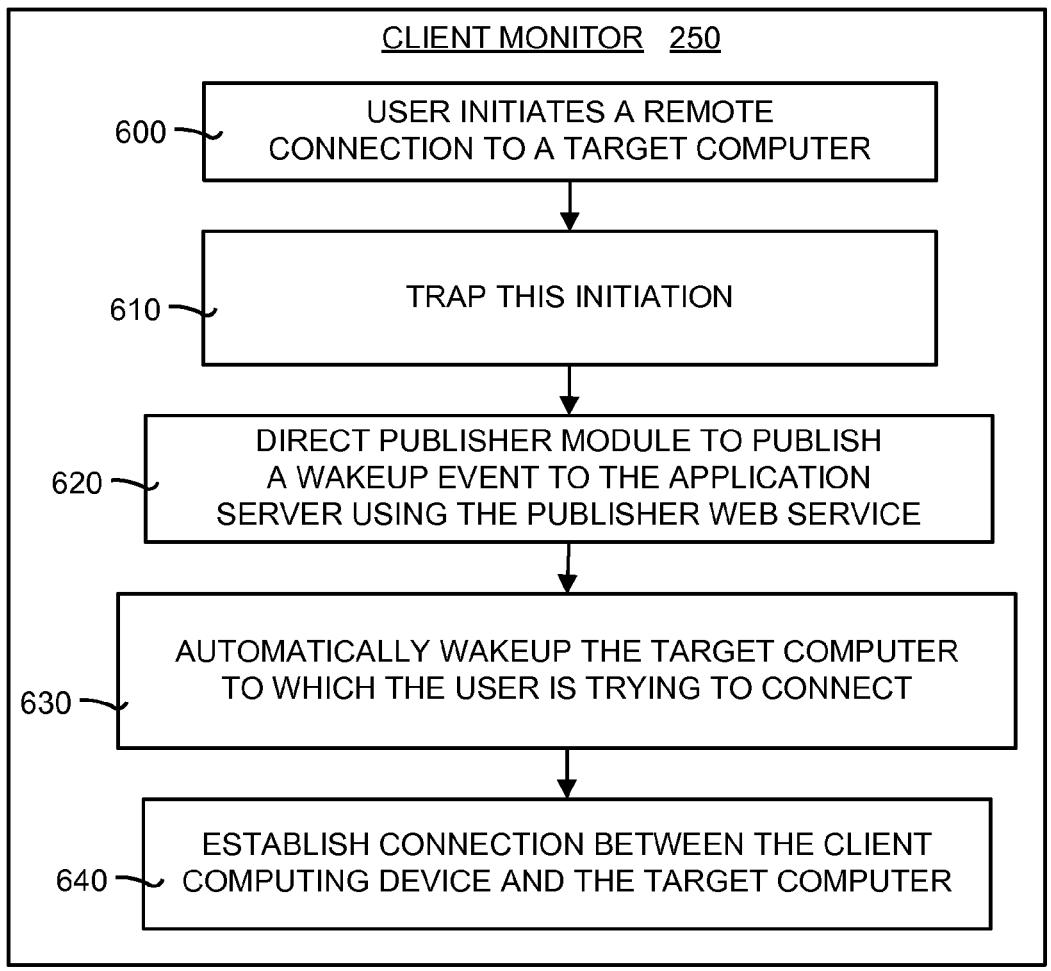
FIG. 6 is a flow diagram illustrating the operational details of embodiments of the client monitor of the client module shown in FIGS. 1-3.

The client monitor 250 resides on the client module 110. The client monitor 250 is a component that the user 200 interacts with indirectly. FIG. 6 is a flow diagram illustrating the operational details of embodiments of the client monitor 250 of the client module 110 shown in FIGS. 1-3. In some embodiments, the client monitor 250 is a filter driver that filters out network traffic to a particular remote client based on some configuration.

More specifically, the operation of the client monitor 250 begins when the user 200 initiates a remote connection to a target computer (box 600). In the embodiments shown in FIG. 4, the target computer is located on the first subnet 400 of the client network system 120. Whenever the user 200 initiates a remote connection to a particular host, the embodiments of the client monitor 250 trap this initiation (box 610). Embodiments of the client monitor 250 then direct the publisher module 150 to publish a wakeup event to the application server 140 using the publisher web service 300 (box 620).

The target computer (or remote machine) that the user is trying to connect to is awakened automatically (box 630). A connection then is established between the client module 110 and the target computer (box 640). In some embodiments this connection goes through for the user 200 within a couple of network-level retransmissions. In some embodiments the client monitor 250 stores a set of complex rules for triggering events that can be modified by the user 200. This particular aspect of embodiments of the stateless remote power management system 100 and method precludes the user 200 from taking any manual action for waking up the target computer to which the user 200 wants to connect. In other words, the intent of the user 200 acts as a trigger for automatically waking up the target (or remote) computer and connecting to it.

IV.B. Application Server

Figure 7:
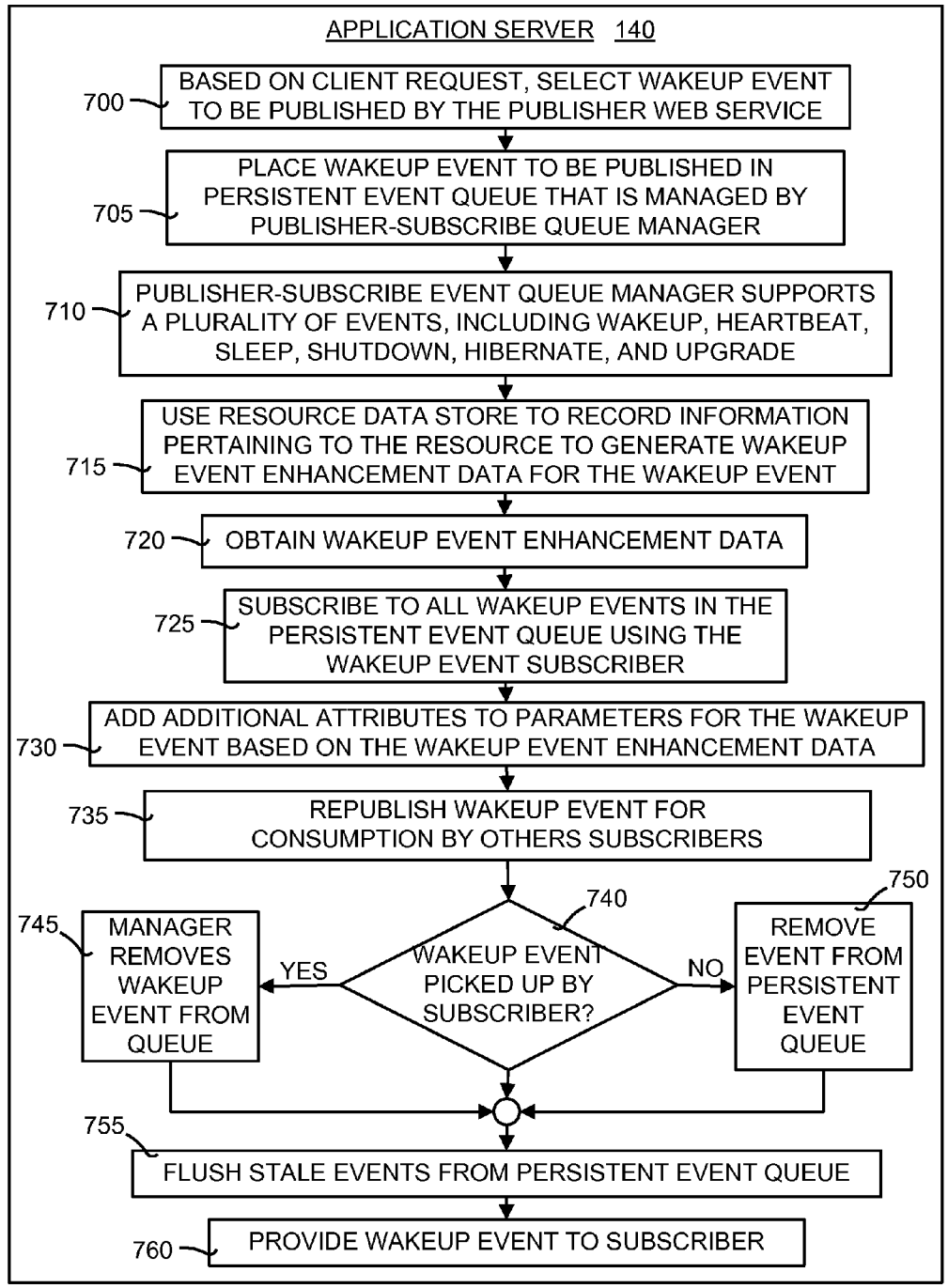
FIG. 7 is a flow diagram illustrating the operational details of embodiments of the application server shown in FIGS. 1-4.

FIG. 7 is a flow diagram illustrating the operational details of embodiments of the application server 140 shown in FIGS. 1-4. The operation begins based on a request from the user 200 through the client module 110. Based on this request, the application server selects an event (such as a wakeup event) to be published by the publisher web service 300 (box 700). As described above, the application server 140 has a publisher web service 300 through which publishers can publish events for subscriber consumption.

The event (such as the wakeup event) to be published then is placed in the persistent event queue 340 that is managed by the publisher-subscribe queue manager 350 (box 705). The publisher-subscribe queue manager 350 supports a variety of events, including a wakeup event, a heartbeat event, a sleep event, a shutdown event, a hibernate event, and an upgrade event (box 710). The publisher-subscribe queue manager 350 includes the following publishers: Heart Beat Publisher, Power Event Publisher, E-mail Publisher, SMS Publisher, and Heart Beat Recorder. The publisher-subscribe queue manager 350 includes the following subscribers: Sleep Event Subscriber, Wakeup Event Subscriber, Wakeup Event Enhancer, and Heart Beat Recorder.

The supported events include the wakeup event, which includes the resource identification, the MAC address of the resource, and the subnet broadcast address. The wakeup event wakes the machine having the resource identification and the MAC address of the machine. The heartbeat event is per machine and includes a resource identifier and a timestamp as the heartbeat. The sleep event includes a resource identification, and puts the machine having the resource identification to sleep. The shutdown event includes a resource identification and shuts down the machine with the given resource identification. The hibernate event includes a resource identification, and hibernates the machine with the given resource identification. The upgrade event, which includes a resource identification, upgrades any bits (including the client service module) on the machine having the given resource identification.

The resource data store 370 is used to record and store information or data pertaining to the resource to generate wakeup event enhancement data for the wakeup event (box 715). The resource data store 370 not only stores enhancement data for the wakeup events, but also the other supported events. In some embodiments the resource data store 370 is a relational database. Alternatively, in other embodiments the resource data store 370 can be a third party information repository.

In the case of the wakeup event, the wakeup event enhancement data then is obtained (box 720). In addition to the publisher web service 300 and the publish-subscribe event queue manager 350, the application server 140 also includes the wakeup event enhancer 360 in communication with the resource data store 370. The wakeup event enhancer 360 subscribes to each of the wakeup events in the persistent event queue 340 using the wakeup event subscriber (box 725). The wakeup event enhancer 360 adds additional attributes (such as the MAC address of the machine and the subnet broadcast event tag) to the event parameters based on the wakeup event enhancement data (box 730). The wakeup event then is republished for consumption by other subscribers (box 735). One purpose of the wakeup event enhancer 360 is to enhance the wakeup events and make the system 100 more seamless for the user 200.

A determination then is made as to whether the wakeup event was picked up by a subscriber (box 740). Any event that is picked up by a subscriber is removed from the persistent event queue 340 by the publisher-subscribe event queue manager 350 (box 745). If the event is not picked up by a subscriber, then the event is removed from the persistent event queue 340 (box 750). In this manner the persistent event queue 340 handles de-duplication of duplicate events and flushing out of stale events from the persistent event queue 340 that may not be of any significance (box 755). The application server 140 then provides the wakeup event to the subscriber (box 760).

IV.C. Publisher Module

Figure 8:
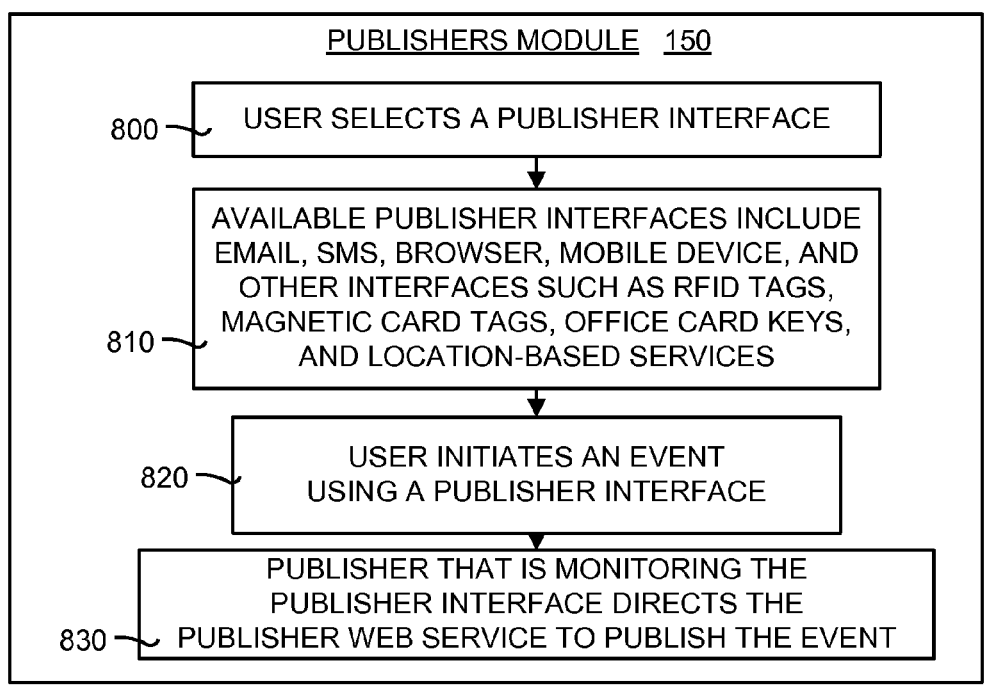
FIG. 8 is a flow diagram illustrating the operational details of embodiments of the publisher module shown in FIGS. 1-3.

FIG. 8 is a flow diagram illustrating the operational details of embodiments of the publisher module 150 shown in FIGS. 1-3. Embodiments of the publisher module 150 allow the integration of a variety of other interfaces for the user 200 so that the user 200 can control the remote power state of the target machine or computing device. The operation of the module 150 begins by the user 200 selecting a publisher interface (box 800).

There are a variety of publisher interfaces available (box 810). These available interfaces are discussed below. The user 200 initiates an event using at least one of the publisher interfaces (box 820). The publisher that is monitoring the publisher interface then directs the publisher web service 300 to publish the event (box 830).

One available publisher interface is an e-mail publisher. The user 200 can write an e-mail with the appropriate verbs indicating to the e-mail publisher a particular action that needs to be taken on behalf of the user 200 and then send it to the system's mailbox. The e-mail publisher monitors this mailbox, reads the verb from the e-mail and publishes an appropriate event through the publish web service 300.

A similar publisher interface is presented for SMS. In this case, a user can send a short message (or text) using their mobile device to a number that is monitored by the publisher module 150. The publisher module 150 reads the message, translates it to an appropriate event and publishes the event. The publisher module 150 acts as a platform that allows easy development of publisher interfaces for events such as RFID tags, magnetic card tags, office card keys and location based services on mobile devices.

IV.D. Client Service Module

Figure 9:
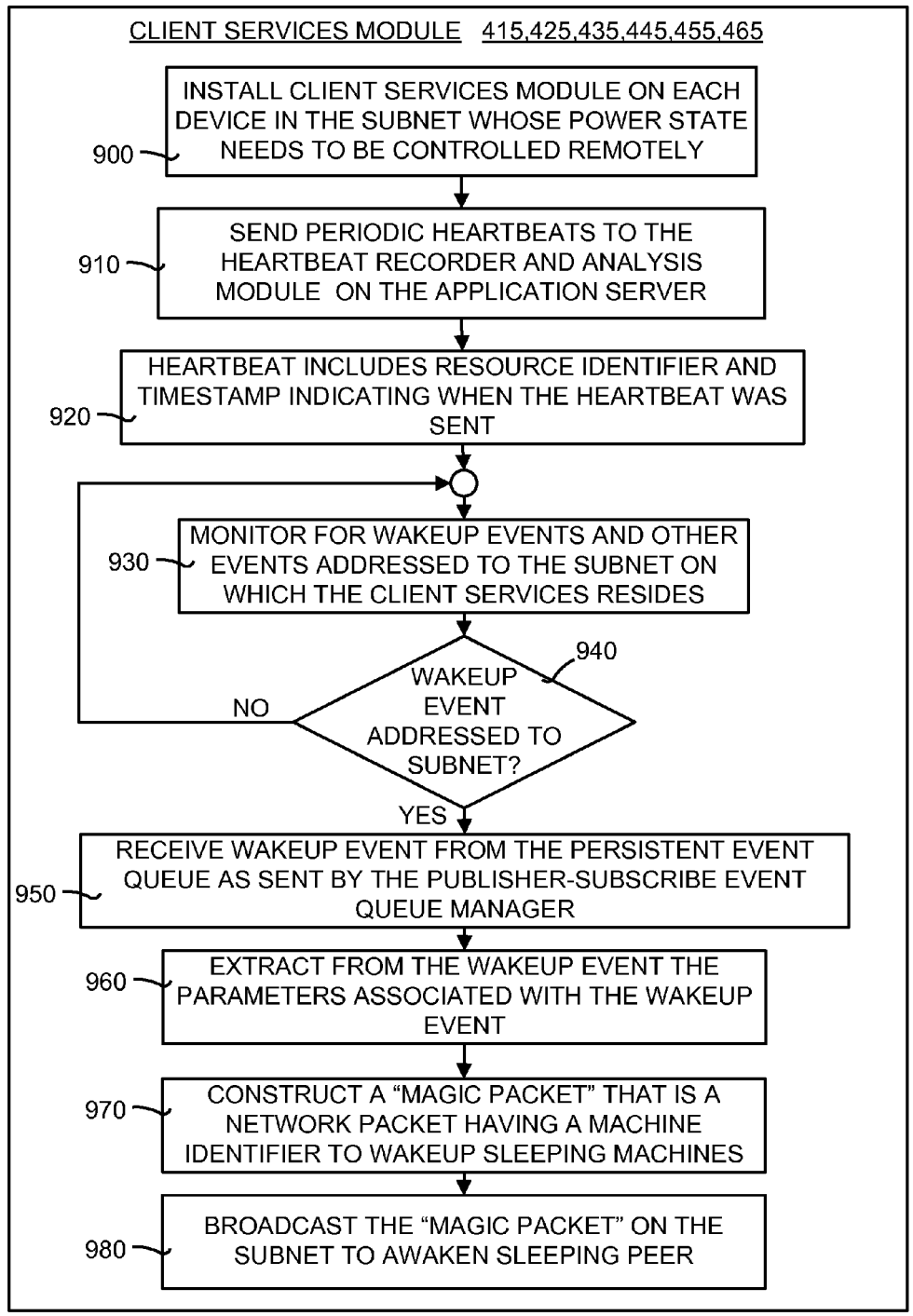
FIG. 9 is a flow diagram illustrating the operational details of embodiments of the client service module of the client network system shown in FIG. 4.

FIG. 9 is a flow diagram illustrating the operational details of embodiments of the client service module 415, 425, 435, 445, 455, 465 of the client network system 120 shown in FIG. 4. Each client service module 415, 425, 435, 445, 455, 465 is a lightweight daemon that runs on each of the computing devices in the subnets whose power states need to be controlled remotely (box 900). The client service module 415, 425, 435, 445, 455, 465 do not store any state or information of the network they are in. They only communicate with the application server 140 periodically.

Each client service module 415, 425, 435, 445, 455, 465 includes a heartbeat publisher that sends periodic heartbeats to the application server 140 whenever the daemon is running (box 910). The heartbeat includes a resource identifier and a timestamp indicating when the heartbeat was sent (box 920). The client service module 415, 425, 435, 445, 455, 465 subscribes to any other events that have its identifier in the event parameters and periodically polls the publisher-subscribe event queue manager 350 for these.

The client service module 415, 425, 435, 445, 455, 465 also monitors for any wakeup events and other events that are addressed to the subnet where it resides (box 930). Besides the wakeup event, these other events that are monitored for include a sleep event, a hibernate event, a shutdown event, and an upgrade event. A determination then is made as to whether the wakeup event is addressed to the subnet (box 940). If there is no wakeup event addressed to the subnet, then the client service module 415, 425, 435, 445, 455, 465 continues to monitor (box 930). If the publisher-subscribe queue manager 350 does have a wakeup event for that subnet, then it is immediately dispatched to the client. This is done by having the client service module 415, 425, 435, 445, 455, 465 receive from the persistent event queue the wakeup event sent by the publisher-subscribe event queue manager (box 950).

The client service module 415, 425, 435, 445, 455, 465 then extracts from the wakeup event the parameters associated with the event (box 960). A "magic packet" directed at the Wake-On-LAN network card is constructed (box 970). The "magic packet" is a network packet having a machine identifier to wakeup sleeping machines on the subnet. The client service module 415, 425, 435, 445, 455, 465 then broadcasts the "magic packet" on the subnet to awaken its sleeping peer (box 980).

IV.E. Heartbeat Recorder and Analysis Module

Figure 10:
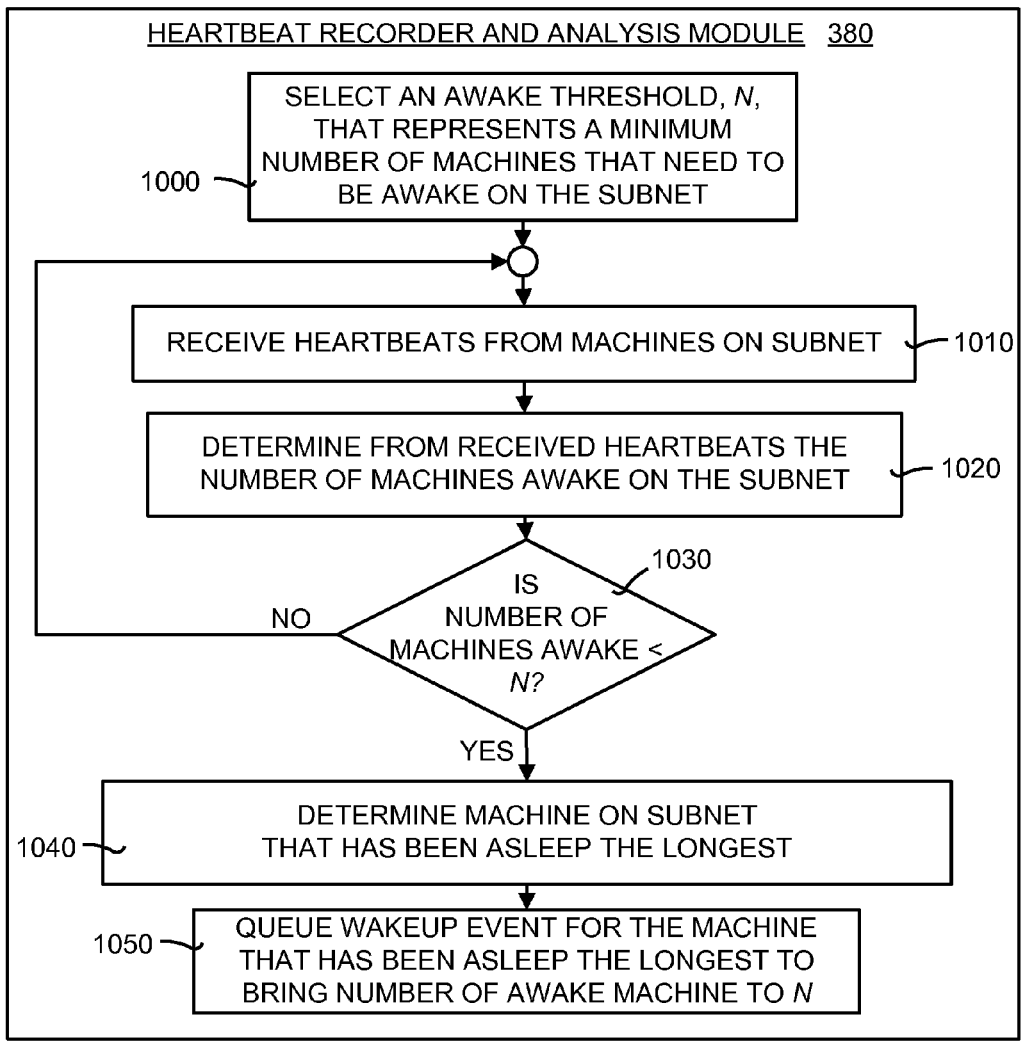
FIG. 10 is a flow diagram illustrating the operational details of embodiments of the heartbeat recorder and analysis module of the application server shown in FIGS. 3 and 4.

FIG. 10 is a flow diagram illustrating the operational details of embodiments of the heartbeat recorder and analysis module 380 of the application server 140 shown in FIGS. 3 and 4. Embodiments of the heartbeat recorder and analysis module 380 have a dual role of a publisher and subscriber and reside on the application server 140. Whenever a computing device on the client network system 120 sends out a heartbeat event, embodiments of the heartbeat recorder and analysis module 380 acts as a subscriber for this particular event and persists this event in the resource data store. Occasionally, usually after a configurable period of time, embodiments of the heartbeat recorder and analysis module 380 check the health of all the computing device on the client network system 120. Embodiments of the heartbeat recorder and analysis module 380 then make a decision of awakening some of the machines within some of the subnets to help keep embodiments of the system 100 up and running.

In particular, as shown in FIG. 10, embodiments of the heartbeat recorder and analysis module 380, the user 200 selects an awake threshold, N, which is a configurable parameter that represents a minimum number of computing devices or machines that need to be awake at any given time on a subnet (box 1000). Embodiments of the heartbeat recorder and analysis module 380 receive heartbeats from machines on each of the subnets (box 1010). By analyzing heartbeat events embodiments of the heartbeat recorder and analysis module 380 ensures this criteria is met.

More specifically, embodiments of the heartbeat recorder and analysis module 380 determine based on the heartbeats received the number of machines awake on a given subnet (box 1020). A determination then is made as to whether the number of machines awake is less than the awake threshold, N (box 1030). If not, then embodiments of the heartbeat recorder and analysis module 380 go back to monitoring the number of machines awake at any given time and comparing it to the awake threshold, N. On the other hand, if the number of machines in a particular subnet that sends their heartbeats drops below the awake threshold, N, embodiments of the heartbeat recorder and analysis module 380 determine the machine on the subnet that has been asleep for the longest amount of time (box 1040). In the case where the number of awake machines falls to zero, then embodiments of the heartbeat recorder and analysis module 380 send an alert to an administrator.

Embodiments of the heartbeat recorder and analysis module 380 select the machines that have been sleeping the longest. In addition, embodiments of the heartbeat recorder and analysis module 380 queue wakeup events for the machine that has been asleep the longest to bring the number of awake machines to equal the awake threshold, N (box 1050). This also prevents insomnia as machines are free to go to sleep based on their power settings and every machine gets a fair share of sleep time. Embodiments of the heartbeat recorder and analysis module 380 perform periodic checks to ensure that this awake threshold is maintained per subnet.

Embodiments of the heartbeat recorder and analysis module 380 also can be used to aggressively conserve power. In particular, embodiments of the module 380 can be used to automatically initiate power-saving events to conserve power within embodiments of the stateless remote power management system 100. The power-saving events include a sleep event, a hibernate event, and a shutdown event.

V. Exemplary Operating Environment

Embodiments of the stateless remote power management system 100 and method are designed to operate in a computing environment. The following discussion is intended to provide a brief, general description of a suitable computing environment in which embodiments of the stateless remote power management system 100 and method may be implemented.

Figure 11:
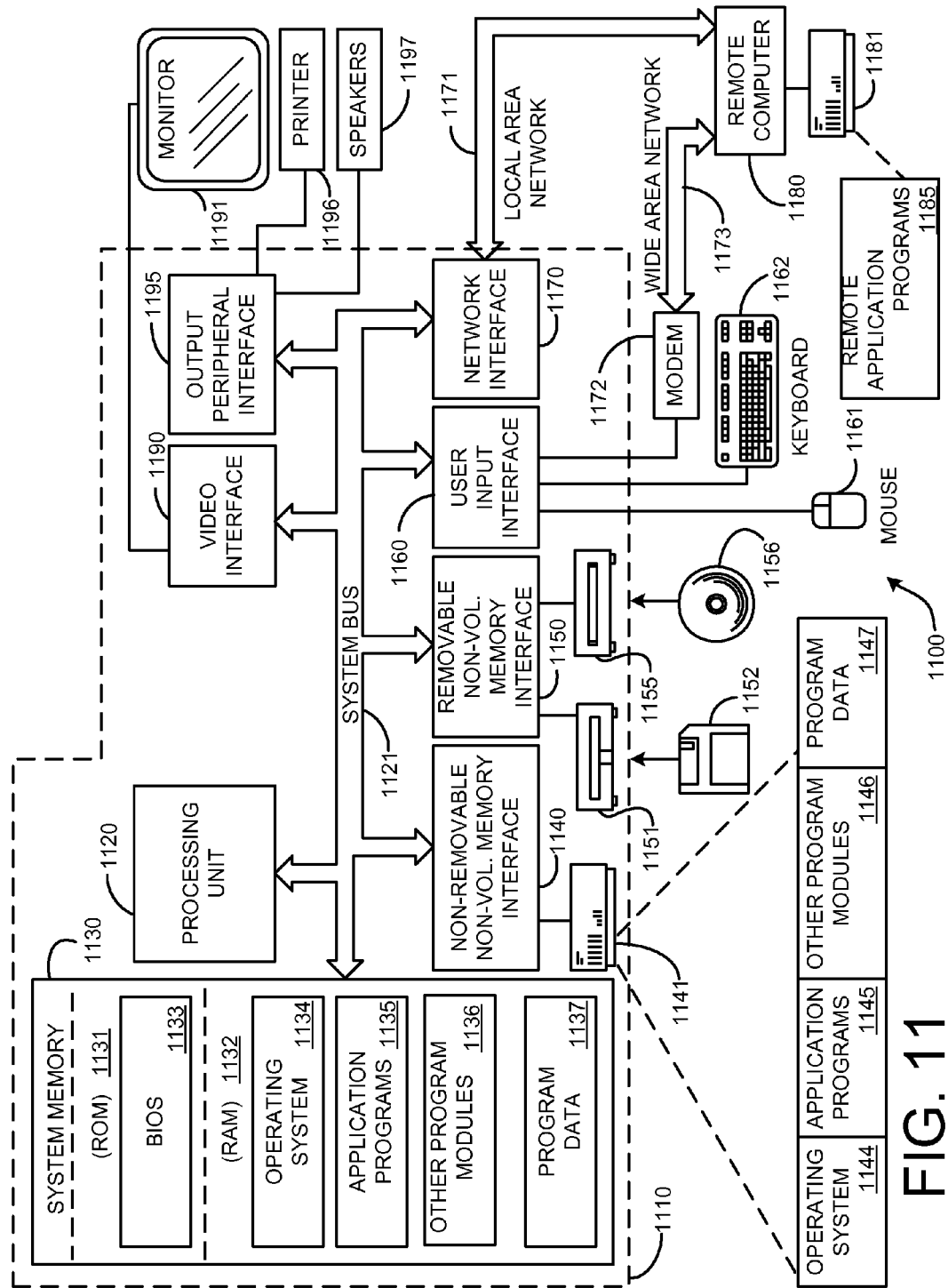
FIG. 11 illustrates an example of a suitable computing system environment in which embodiments of the stateless remote power management system and method shown in FIGS. 1-10 may be implemented.

FIG. 11 illustrates an example of a suitable computing system environment in which embodiments of the stateless remote power management system 100 and method shown in FIGS. 1-10 may be implemented. The computing system environment 1100 is only one example of a suitable computing environment and is not intended to suggest any limitation as to the scope of use or functionality of the invention. Neither should the computing environment 1100 be interpreted as having any dependency or requirement relating to any one or combination of components illustrated in the exemplary operating environment.

Embodiments of the stateless remote power management system 100 and method are operational with numerous other general purpose or special purpose computing system environments or configurations. Examples of well known computing systems, environments, and/or configurations that may be suitable for use with embodiments of the stateless remote power management system 100 and method include, but are not limited to, personal computers, server computers, hand-held (including smartphones), laptop or mobile computer or communications devices such as cell phones and PDA's, multiprocessor systems, microprocessor-based systems, set top boxes, programmable consumer electronics, network PCs, minicomputers, mainframe computers, distributed computing environments that include any of the above systems or devices, and the like.

Embodiments of the stateless remote power management system 100 and method may be described in the general context of computer-executable instructions, such as program modules, being executed by a computer. Generally, program modules include routines, programs, objects, components, data structures, etc., that perform particular tasks or implement particular abstract data types. Embodiments of the stateless remote power management system 100 and method may also be practiced in distributed computing environments where tasks are performed by remote processing devices that are linked through a communications network. In a distributed computing environment, program modules may be located in both local and remote computer storage media including memory storage devices. Still further, the aforementioned instructions could be implemented, in part or in whole, as hardware logic circuits, which may or may not include a processor. With reference to FIG. 11, an exemplary system for embodiments of the stateless remote power management system 100 and method includes a general-purpose computing device in the form of a computer 1110.

Components of the computer 1110 may include, but are not limited to, a processing unit 1120 (such as a central processing unit, CPU), a system memory 1130, and a system bus 1121 that couples various system components including the system memory to the processing unit 1120. The system bus 1121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 1110 typically includes a variety of computer readable media. Computer readable media can be any available media that can be accessed by the computer 1110 and includes both volatile and nonvolatile media, removable and non-removable media. By way of example, and not limitation, computer readable media may comprise computer storage media and communication media. Computer storage media includes volatile and nonvolatile removable and non-removable media implemented in any method or technology for storage of information such as computer readable instructions, data structures, program modules or other data.

Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by the computer 1110. By way of example, and not limitation, communication media includes wired media such as a wired network or direct-wired connection, and wireless media such as acoustic, RF, infrared and other wireless media. Combinations of any of the above should also be included within the scope of computer readable media.

The system memory 1130 includes computer storage media in the form of volatile and/or nonvolatile memory such as read only memory (ROM) 1131 and random access memory (RAM) 1132. A basic input/output system 1133 (BIOS), containing the basic routines that help to transfer information between elements within the computer 1110, such as during start-up, is typically stored in ROM 1131. RAM 1132 typically contains data and/or program modules that are immediately accessible to and/or presently being operated on by processing unit 920. By way of example, and not limitation, FIG. 11 illustrates operating system 1134, application programs 1135, other program modules 1136, and program data 1137.

The computer 1110 may also include other removable/non-removable, volatile/nonvolatile computer storage media. By way of example only, FIG. 11 illustrates a hard disk drive 1141 that reads from or writes to non-removable, nonvolatile magnetic media, a magnetic disk drive 1151 that reads from or writes to a removable, nonvolatile magnetic disk 1152, and an optical disk drive 1155 that reads from or writes to a removable, nonvolatile optical disk 1156 such as a CD ROM or other optical media.

Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 1141 is typically connected to the system bus 1121 through a non-removable memory interface such as interface 1140, and magnetic disk drive 1151 and optical disk drive 1155 are typically connected to the system bus 1121 by a removable memory interface, such as interface 1150.

The drives and their associated computer storage media discussed above and illustrated in FIG. 11, provide storage of computer readable instructions, data structures, program modules and other data for the computer 1110. In FIG. 11, for example, hard disk drive 1141 is illustrated as storing operating system 1144, application programs 1145, other program modules 1146, and program data 1147. Note that these components can either be the same as or different from operating system 1134, application programs 1135, other program modules 1136, and program data 1137. Operating system 1144, application programs 1145, other program modules 1146, and program data 1147 are given different numbers here to illustrate that, at a minimum, they are different copies. A user may enter commands and information (or data) into the computer 1110 through input devices such as a keyboard 1162, pointing device 1161, commonly referred to as a mouse, trackball or touch pad, and a touch panel or touch screen (not shown).

Other input devices (not shown) may include a microphone, joystick, game pad, satellite dish, scanner, radio receiver, or a television or broadcast video receiver, or the like. These and other input devices are often connected to the processing unit 1120 through a user input interface 1160 that is coupled to the system bus 1121, but may be connected by other interface and bus structures, such as, for example, a parallel port, game port or a universal serial bus (USB). A monitor 1191 or other type of display device is also connected to the system bus 1121 via an interface, such as a video interface 1190. In addition to the monitor, computers may also include other peripheral output devices such as speakers 1197 and printer 1196, which may be connected through an output peripheral interface 1195.

The computer 1110 may operate in a networked environment using logical connections to one or more remote computers, such as a remote computer 1180. The remote computer 1180 may be a personal computer, a server, a router, a network PC, a peer device or other common network node, and typically includes many or all of the elements described above relative to the computer 1110, although only a memory storage device 1181 has been illustrated in FIG. 11. The logical connections depicted in FIG. 11 include a local area network (LAN) 1171 and a wide area network (WAN) 1173, but may also include other networks. Such networking environments are commonplace in offices, enterprise-wide computer networks, intranets and the Internet.

When used in a LAN networking environment, the computer 1110 is connected to the LAN 1171 through a network interface or adapter 1170. When used in a WAN networking environment, the computer 1110 typically includes a modem 1172 or other means for establishing communications over the WAN 1173, such as the Internet. The modem 1172, which may be internal or external, may be connected to the system bus 1121 via the user input interface 1160, or other appropriate mechanism. In a networked environment, program modules depicted relative to the computer 1110, or portions thereof, may be stored in the remote memory storage device. By way of example, and not limitation, FIG. 11 illustrates remote application programs 1185 as residing on memory device 1181. It will be appreciated that the network connections shown are exemplary and other means of establishing a communications link between the computers may be used.

The foregoing Detailed Description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. A method for awakening a remote computing device, comprising:
   publishing a wakeup event from an application server that is subscribed to by a subnet in a client network system having a plurality of computing devices in the subnet including the remote computing device, where at least one of the computing devices in the subnet is awake and other computing devices in the subnet are asleep including the remote computing device;
   receiving the wakeup event at an awake computing device on the subnet;
   awakening the remote computing device using the awake computing device on the subnet;
   selecting an awake threshold that represents a minimum number of computing devices that need to be awake at any given time on the subnet;
   sending out periodic heartbeats to the application server to inform the application server of a number of computing devices that are awake on the subnet; and
   rotating between the plurality of computing devices on the subnet computing devices that are awake and computing devices that are asleep so that different computing devices on the subnet are awake at any given time and are able to receive the wakeup event and awaken the remote computing device, wherein the rotation of computing devices ensures that the number of computing devices that are awake is not less than the awake threshold.

2. The method of claim 1, further comprising constructing a "magic packet" using the awake computing device to awaken the remote computing device using a "Wake-On-LAN" feature on a network card of the remote computing device.

3. The method of claim 2, further comprising broadcasting the "magic packet" on the subnet using the awake computing device to awaken the remote computing device.

4. The method of claim 2, further comprising using a stateless handling of the wakeup event at the network layer of the subnet to eliminate a need for a dedicated proxy server on the subnet, such that any computing device on the subnet can send the "magic packet."

5. The method of claim 1, further comprising requesting from a client computing device that the application server send the wakeup event to the remote computing device, where the application server is in communication with the client computing device over a first computer network.

6. The method of claim 1, further comprising requesting from a web page, an e-mail, a short message service (SMS), a radio frequency identification (RFID) sensor, or a magnetic sensor that the application server send the wakeup event to the remote computing device, where the application server is in communication with the client computing device over a first computer network.

7. A stateless remote power management system for remotely waking up a sleeping target computing device, comprising:
    a client module for initiating a request to send a wakeup event to the target computer;
    an application server for receiving the request and placing a wakeup event in a persistent event queue, wherein the client module and the application server are in communication over a computer network, the application server comprising a heartbeat recorder and analysis module that selects an awake threshold that represents a minimum number of computing devices that need to be awake at any given time, determines whether a minimum number of computing devices awake is less than the awake threshold and if so, wakes up a computing device that has been asleep the longest; and
    a client network system having a subnet in communication with the application server, the subnet further comprising:
        an awake computing device for obtaining the wakeup event from the persistent event queue using stateless handling of the wakeup event at the network layer of the subnet to eliminate a need for a dedicated proxy server on the subnet;
        a plurality of sleeping computing devices including the target computing device; and
        a "magic packet" that is broadcast on the subnet using the awake computing device to awaken the target computing device.

8. The stateless remote power management system of claim 7, further comprising:
    a client monitor residing on the client module that traps the request; and
    a publisher web service residing on the application server that is directed by the trapped request to publish the wakeup event.

9. The stateless remote power management system of claim 8, further comprising a wakeup event enhancer residing on the application server that subscribes to the wakeup event in the persistent event queue, adds additional attributes to the wakeup event, and republishes the wakeup event for consumption by other subscribers.

10. The stateless remote power management system of claim 7, further comprising a publisher module that receives the request that was initiated by a web page, an e-mail, a short messaging service (SMS), a radio frequency identification (RFID) sensor, or a magnetic sensor.

11. The stateless remote power management system of claim 7, further comprising a client service module that resides on each computing device on the subnet and monitors the computer network for events addressed to the subnet, these events including the wakeup event, a sleep event, a hibernate event, a shutdown event, and an upgrade event, and extracts from the wakeup event attributes that were added to the wakeup event that include a machine identifier, and constructing the "magic packet" that is a network packet having the machine identifier to wake up the sleeping target computing device.

12. The stateless remote power management system of claim 11, further comprising a heartbeat sent from the client service module to the application server that lets the application server know a number of computing devices on the subnet that are awake.

13. The stateless remote power management system of claim 7, wherein the application server receives periodic heartbeats informing the application server of the number of computing devices that are awake on the subnet and wakes up a computing device on the subnet that has been asleep the longest if the received periodic heartbeats indicate that the number of computing devices awake on the subnet is less than the awake threshold.

14. A method for remotely awakening a target computing device over the Internet, comprising:
    selecting a wakeup event to be published at an application server on a computer network based on a request from a client over the computer network;
    placing a wakeup event to be published in a persistent event queue, where the wakeup event is addressed to the target computing device and a subnet on which the target computing device is located;
    using the subnet to monitor the persistent event queue for the wakeup event;
    receiving the wakeup event at the subnet from the persistent event queue;
    giving the wakeup event to an awake computing device on the subnet;
    awakening the target computing device using the awake computing device;
    selecting an awake threshold that represents a minimum number of computing devices that need to be awake at any given time on the subnet;
    sending out periodic heartbeats to the application server to inform the application server of a number of computing devices that are awake on the subnet; and
    rotating which of computing devices on the subnet is the awake computing device such that any awake computing device on the subnet can awaken the target computing device and no dedicated proxy server is needed on the subnet to awaken the target computing device, wherein the rotation of computing devices ensures that the number of computing devices that are awake is not less than the awake threshold.

15. The method of claim 14, further comprising:
    constructing a "magic packet" that is a network packet having a machine identifier of the target computing device; and
    broadcasting the "magic packet" over the subnet to wakeup the target computing device.

16. The method of claim 14, further comprising comparing from the periodic heartbeats received at the application server the number of computing devices awake on the subnet to the awake threshold.

17. The method of claim 14, further comprising determining which computing devices on the subnet have been sleeping the longest as compared to other computing devices on the subnet.

18. The method of claim 17, further comprising:
    determining that the number of computing devices awake on the subnet is less than the awake threshold; and awakening a number of sleeping computing devices on the subnet that have been sleeping the longest to bring the number of computing devices awake on the subnet equal to the awake threshold.

19. The method of claim 14, further comprising:

using a resource data store to record information pertaining to the target computing device to generate wakeup enhancement data for the wakeup event;

adding the wakeup enhancement data to the wakeup event that is in the persistent event queue;

republishing the wakeup event for consumption by other subscribers such as the subnet; and providing the wakeup event to the subnet.

20. The method of claim 19, further comprising:

initiating from a client computing device a request to publish a wakeup event to awaken the target computing device;

using the application server to trap the request; and processing the request to generate the wakeup event.

* * * * *